(12) United States Patent
Matsueda

(10) Patent No.: US 7,575,106 B2
(45) Date of Patent: Aug. 18, 2009

(54) BICYCLE WHEEL DRIVING DEVICE

(75) Inventor: Keiji Matsueda, Sakai (JP)

(73) Assignee: Shimano Inc., Osaka (JP)

( * ) Notice: Subject to any disclaimer, the term of this patent is extended or adjusted under 35 U.S.C. 154(b) by 381 days.

(21) Appl. No.: 11/390,120

(22) Filed: Mar. 28, 2006

(65) Prior Publication Data

US 2006/0283644 A1 Dec. 21, 2006

(30) Foreign Application Priority Data

Jun. 17, 2005 (JP) .............................. 2005-177232

(51) Int. Cl.
*F16D 65/10* (2006.01)
*B60B 19/10* (2006.01)

(52) U.S. Cl. .............................. 188/218 R; 188/206 R; 188/26; 301/6.1

(58) Field of Classification Search .................. 188/17, 188/18 R, 25, 26, 2 D, 74, 79, 218 R, 206 R; 301/6.1, 6.5, 6.6, 6.7
See application file for complete search history.

(56) References Cited

U.S. PATENT DOCUMENTS

| | | | |
|---|---|---|---|
| 4,721,177 A | | 1/1988 | Qizhen |
| 5,524,734 A | * | 6/1996 | Hanada ........................ 188/26 |
| 5,535,855 A | * | 7/1996 | Hanada .................... 188/24.14 |
| 5,961,416 A | * | 10/1999 | Shoge ........................ 475/297 |

FOREIGN PATENT DOCUMENTS

| | | |
|---|---|---|
| EP | 0 537 693 A1 | 4/1993 |
| EP | 0 688 713 A2 | 12/1995 |
| EP | 0688713 A2 * | 12/1995 |
| EP | 0 706 909 A2 | 4/1996 |
| EP | 0 771 721 A1 | 5/1997 |
| EP | 0 881 141 A2 | 12/1998 |
| EP | 1 103 455 A2 | 5/2001 |
| EP | 1 122 094 A2 | 8/2001 |
| JP | 10227321 A * | 8/1998 |
| JP | 11-059556 A | 3/1999 |
| JP | 2004-25941 | 1/2004 |

OTHER PUBLICATIONS

English abstract of DD-143810, publication date: Sep. 10, 1980, inventor: E. Drechsel.*

* cited by examiner

*Primary Examiner*—Melody M Burch
(74) *Attorney, Agent, or Firm*—Global IP Counselors, LLP (57) ABSTRACT

A motor-equipped hub is provided with a hub axle, a hub shell, a motor drive unit and a roller brake device. The hub shell is arranged around the outside of the hub axle, has a hub flange on an outside circumference thereof, and has a housing space on the inside thereof. The motor drive unit is housed inside the housing space and configured to rotate the hub shell with respect to the hub axle. The roller brake device is arranged within the hub shell to the outside of the housing space.

2 Claims, 6 Drawing Sheets

BICYCLE WHEEL DRIVING DEVICE

CROSS-REFERENCE TO RELATED APPLICATIONS

This application claims priority under 35 U.S.C. § 119 to Japanese Patent Application No. 2005-177232. The entire disclosure of Japanese Patent Application No. 2005-177232 is hereby incorporated herein by reference.

BACKGROUND OF THE INVENTION

1. Field of the Invention

This invention generally relates to a wheel driving device. More particularly, the present invention relates to a bicycle wheel driving device configured to drive a wheel of a bicycle using an electric motor.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In recent years, bicycles equipped with a motor or the like are becoming increasingly popular to supplement the power imparted by pedaling (motor-assisted bicycles). Particularly in China, there is a marked increase in the popularity of electric powered bicycles that have an electric motor built into a hub of a wheel. These electric motors are configured either to assist with the rotation of the wheels or to drive the rotation of the wheels altogether such that the bicycle moves forward even if the rider does not pedal.

One conventional bicycle that uses a hub equipped with an internal motor (hereinafter called "motor-equipped hub") is disclosed in Japanese Laid-Open Patent Publication No. 2004-25941. In this publication, a conventional motor-equipped hub comprises a hub axle and a casing to protect the hub axle. The casing comprises a stationary casing that is fixed to the hub axle and a hub shell (rotary drum) that covers the hub axle. Brake shoes of an internal expanding drum brake device are provided on the stationary casing. A brake drum for the internal expanding drum brake device is fixed to a cylindrical part formed so as to protrude from a bearing supported portion of the hub shell.

Such electric power bicycles are heavier because they require an electric motor and a battery serving as a power source. They can also travel at higher speeds than regular (non-motorized) bicycles because they are driven or assisted by the electric motor. Even though the inertia forces of electric powered bicycles are higher than those of normal (non-electric powered) bicycles, the electric powered bicycles are equipped with the same general-purpose brakes as regular bicycles, e.g., internal expanding drum brakes, band brakes, cantilever brakes, etc.

When a motor-equipped hub is installed on a bicycle, the mass of the bicycle increases and the bicycle is enabled to travel at higher speeds. Consequently, a brake device capable of delivering a larger braking force is preferable. However, conventional motor-equipped hubs are provided with internal expanding drum brake devices, which have rocking (pivoting) brake shoes of which only a portion contacts the-brake drum when the brake device is operated. As a result, when the brake device is operated such that strong braking forces are developed, large amounts of heat are generated and the coefficient of friction declines, making it difficult to obtain a sufficient braking force in a stable manner.

In view of the above, it will be apparent to those skilled in the art from this disclosure that there exists a need for an improved wheel driving device. This invention addresses this need in the art as well as other needs, which will become apparent to those skilled in the art from this disclosure.

SUMMARY OF THE INVENTION

One object of the present invention is to provide a bicycle wheel driving device configured to drive a bicycle wheel using an electric motor, wherein a sufficient braking force can be obtained in a stable manner.

The foregoing object can basically be attained by providing a bicycle wheel driving device in accordance with the first aspect of the present invention that basically comprises a hub axle, a hub shell, a motor, and a roller brake device. The hub shell is arranged around the outside of the hub axle, has a hub flange on an outside circumference thereof, and has a housing space inside. The motor drive unit is housed inside the housing space and configured to rotate the hub shell with respect to the hub axle. The roller brake device is arranged within the hub shell to the outside of the housing space.

When this wheel driving device is installed on the front wheel or rear wheel of a bicycle, the hub shell is driven by the motor-equipped drive unit and the bicycle is enabled to move using electric power. When such a wheel driving device is installed on a bicycle, the mass of the bicycle increases and the traveling speeds increase. As a result, larger braking forces are needed than in the case of a human powered bicycle. Since this wheel driving device is equipped with a roller brake device installed inside the hub shell, the brake shoes are pressed by the rollers in such a fashion that the entire contact surface of each brake shoe contacts the brake drum when the brake device is operated. Consequently, even if the brake device is operated such that large braking forces are produced, the amount of generated heat is smaller and the coefficient of friction is less likely to decline. As a result, large braking forces can be obtained in a stable manner. Thus, even though the installation of the wheel driving device causes the mass and speed of the bicycle to increase, a sufficient braking force can be obtained in a stable manner. In the bicycle wheel driving device in accordance with the second aspect of the present invention, the roller brake device comprises: a stationary bracket configured such that it can be fastened to the bicycle; a cylindrical brake drum arranged such that it can rotate integrally with the hub shell and having a braking surface on an internal circumferential surface thereof; a plurality of brake shoes that are arranged to be non-rotatable with respect to the stationary bracket, each have a contact surface that can contact the braking surface, and serve to apply braking action against the brake drum; a force applying member configured and arranged to apply forces against the brake shoes in radially inward directions; and a brake operating unit having a plurality of rollers arranged with spaces there-between in a circumferential direction and a cam mechanism configured to press the rollers in a radially outward direction when turned, the braking operating unit being configured to press the brake shoes against the brake drum. With this bicycle wheel driving device, the brake shoes are pressed against the drum by the rollers when the cam mechanism is turned in one direction, and the brake shoes are moved away from the brake drum by the force applying member, i.e., the brake is released, when the cam mechanism is turned in the other direction.

In the bicycle wheel driving device in accordance with the third aspect of the present invention, the brake drum has an engaging part that is provided on an external circumferential surface thereof and configured to engage non-rotatably with the hub shell. With this bicycle wheel driving device, the brake drum and the hub shell can be provided as separate entities, making maintenance of the brake device easier to carry out.

In the bicycle wheel driving device in accordance with the fourth aspect of the present invention, the engaging part comprises serrations arranged along a circumferential direction. With this bicycle wheel driving device, since the hub shell and brake drum are connected using serrations, the braking force can be transmitted from the brake drum to the hub shell with a large transmitted torque regardless of the direction in which the hub shell is rotating.

In the bicycle wheel driving device in accordance with the fifth aspect of the present invention, the engaging part comprises a screw thread oriented in such a direction that the engagement between the brake drum and the hub shell tightens when the bicycle wheel is braked while rotating in a direction corresponding to forward movement of the bicycle. With this bicycle wheel driving device, the braking force can be transmitted reliably from the brake drum to the hub shell because the screw connection does not loosen but tightens if the bicycle wheel rotates in a direction corresponding to forward movement of the bicycle with respect to the brake drum during braking.

In the bicycle wheel driving device in accordance with the sixth aspect of the present invention, brake drum is rotatably supported on the hub axle by means of a bearing and the end section of the hub shell on the side where the roller brake device is installed is rotatably supported on the hub axle by means of the brake drum. With this bicycle wheel driving device, the rotation of the brake drum is smoother.

Since a wheel driving device in accordance with the present invention is equipped with a roller brake device installed inside the hub shell, the brake shoes are pressed by the rollers in such a fashion that the entire contact surface of each brake shoe contacts the brake drum when the brake device is operated. Thus, even if the brake device is operated such that large braking forces are produced, the amount of generated heat is smaller and the coefficient of friction is less likely to decline. As a result, large braking forces can be obtained in a stable manner. Thus, even though the installation of the wheel driving device causes the mass and speed of the bicycle to increase, a sufficient braking force can be obtained in a stable manner.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
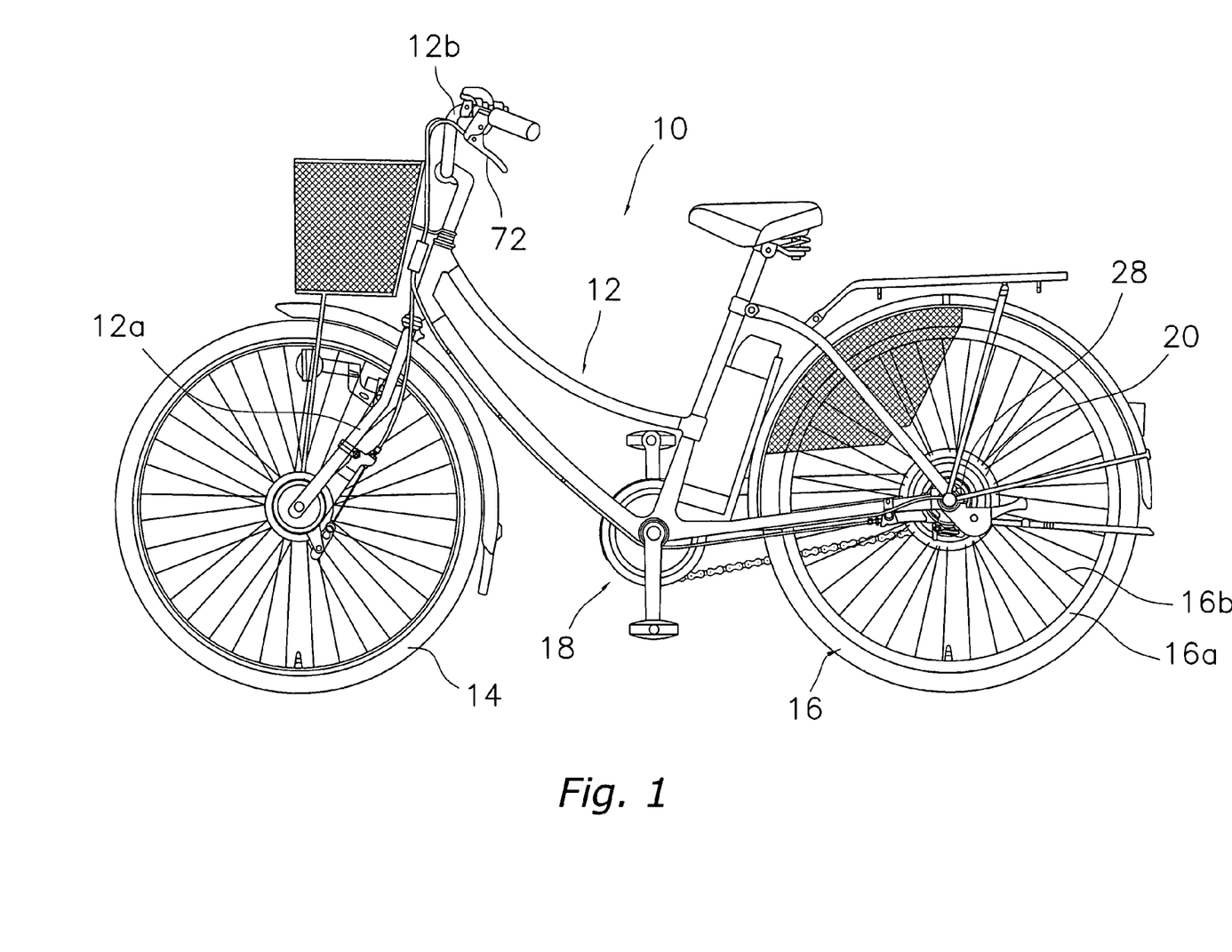
FIG. 1 is a side elevational view of a bicycle that is equipped with a motor-equipped hub in accordance with a first embodiment of the present invention.

Referring initially to FIG. 1, a bicycle 10 is illustrated that is equipped in accordance with a first embodiment of the present invention. The bicycle 10 includes among other things a frame 12 with a front fork 12a, a front wheel 14, a rear wheel 16 and a manually powered drive train 18. The front and rear wheels 14 and 16 are arranged on the front and rear of the frame 12 with the manually powered drive train 18 arranged to drive the rear wheel 16 using human power. The manually powered drive train 18 includes one or more front sprockets, one or more rear sprockets, a chain and a crank set. A motor-equipped hub 20 (also referred to as the "bicycle wheel driving device" herein) is installed at the center of the rear wheel 16 for driving the rear wheel 16 using an electric motor.

Figure 2:
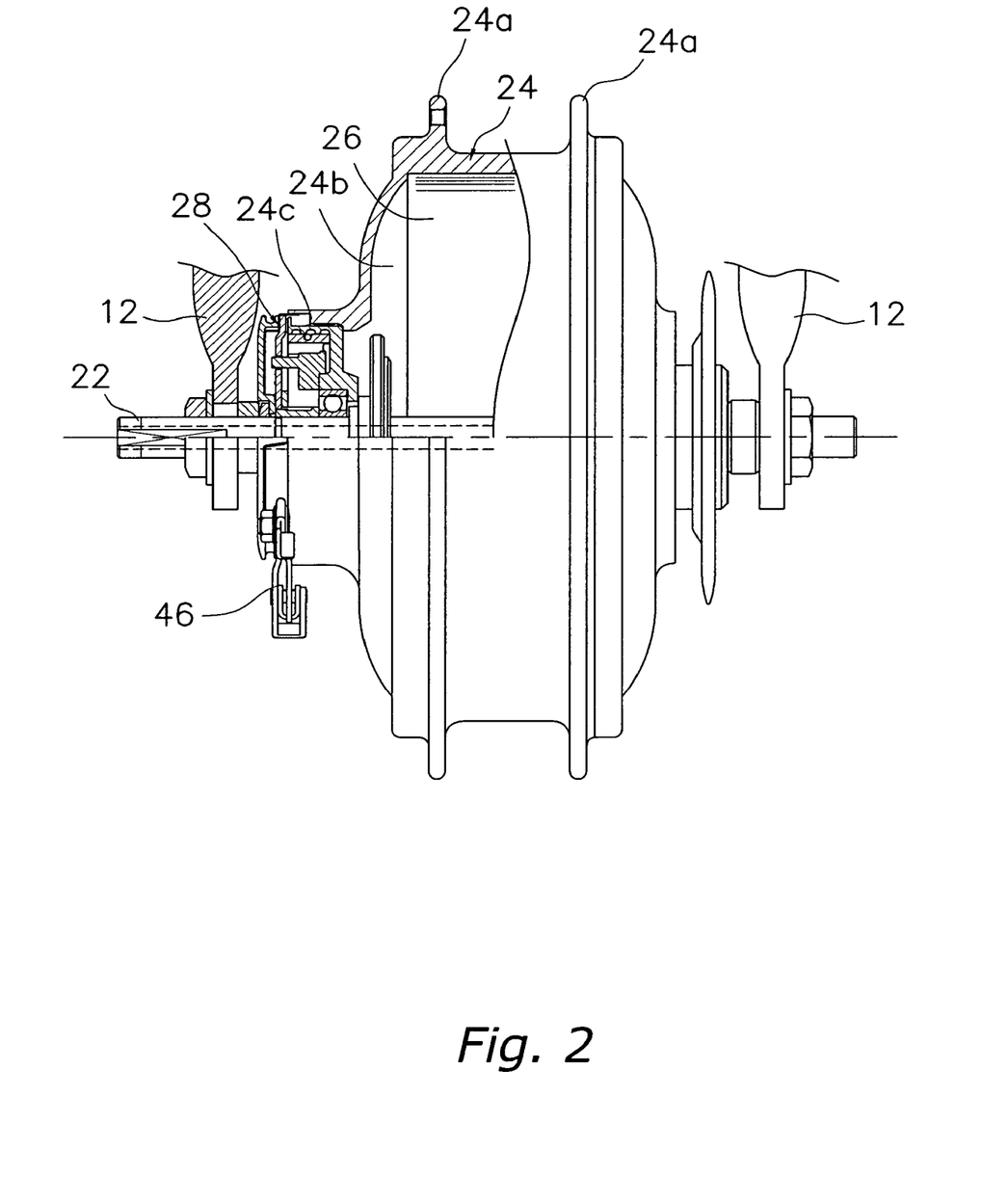
FIG. 2 is a front elevational view of the motor-equipped hub with a portion cut-away for purposes of illustration.

As shown in FIG. 2, the motor-equipped hub 20 basically includes a hub shaft or axle 22, a hub shell 24, an electric motor or drive unit 26 and a roller brake device 28. The hub axle 22 is configured and arranged such that it can be mounted to a rear end part of the frame 12 of the bicycle 10. The hub shell 24 has a pair of hub flanges 24a, a housing space 24b and a brake installation section 24c with a plurality of internal protrusions 24d. The hub flanges 24a are located on the external circumference of the hub shell 24. The housing space 24b is formed on the inside of the hub shell 24. The rim 16a of the rear wheel 16 is connected to the hub flanges 24a with spokes 16b. The hub shell 24 is configured and arranged to be disposed around the outside of the hub axle 22 such that the hub axle 22 extends axially through the housing space 24b . The electric motor 26 is configured and arranged within to rotate the hub shell 24 with respect to the hub axle 22 in a conventional manner. The roller brake device 28 is attached to one end of the hub shell 24 such that the roller brake device 28 is partially disposed within the one end of the hub shell 24.

Figure 3:
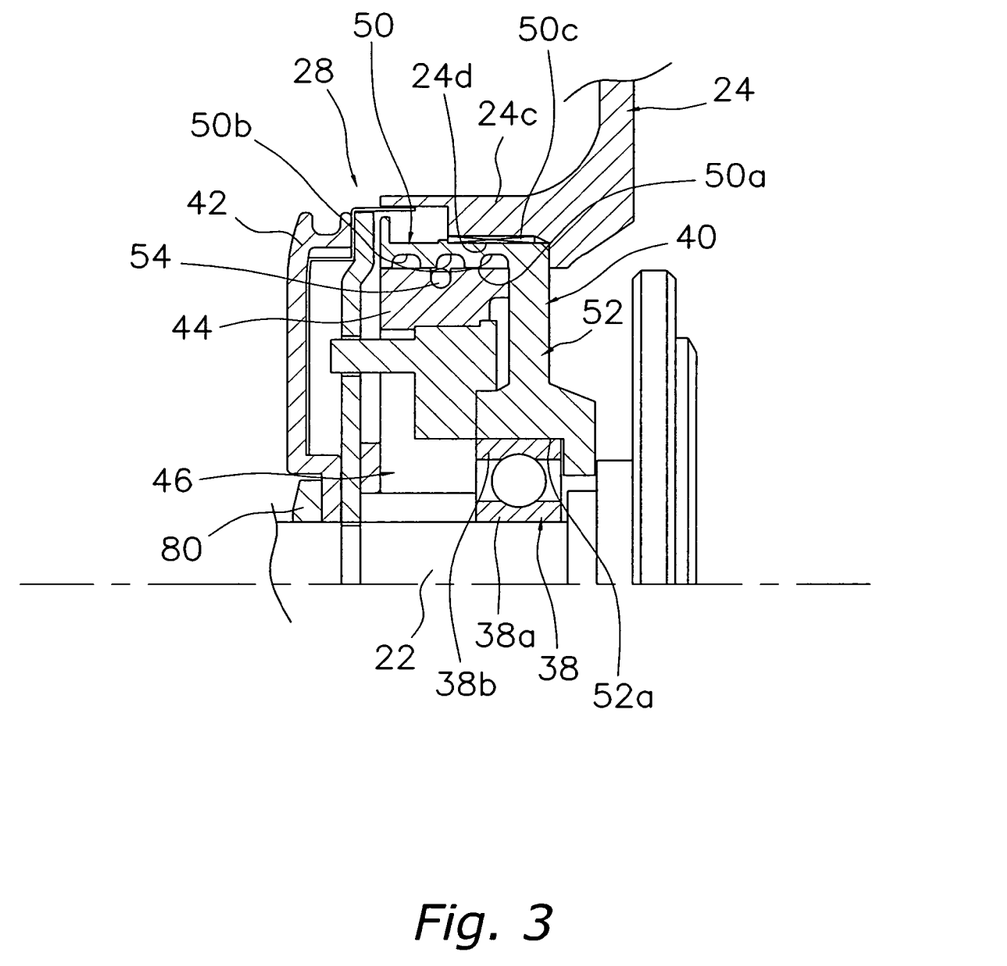
FIG. 3 is an enlarged partial cross sectional view of the motor-equipped hub in the vicinity of the roller brake mounting adapter.

The brake installation section 24c is provided on the side of the hub shell 24 depicted as the left side in FIG. 2. The brake installation section 24c is a cylindrical section inside which the roller brake device 28 is installed. The brake installation section 24c is positioned to the outside of the housing space 24b . The protrusions 24d are provided on the internal circumferential surface of the brake installation section 24c, as shown in FIG. 3. The protrusions 24d serve to enable a brake drum 40 (discussed later) to be connected to the hub shell 24 in a non-rotatable manner. The protrusions 24d comprise serrations, splines, or other protrusions that have a width of, for example, 1 to 3 mm and that are spaced apart from one another in the circumferential direction. As shown in FIG. 2, the motor drive unit 26 is fixed to the hub axle 22 and configured to rotate the hub shell 24 with respect to the hub axle 22 in a conventional manner.

Figure 4:
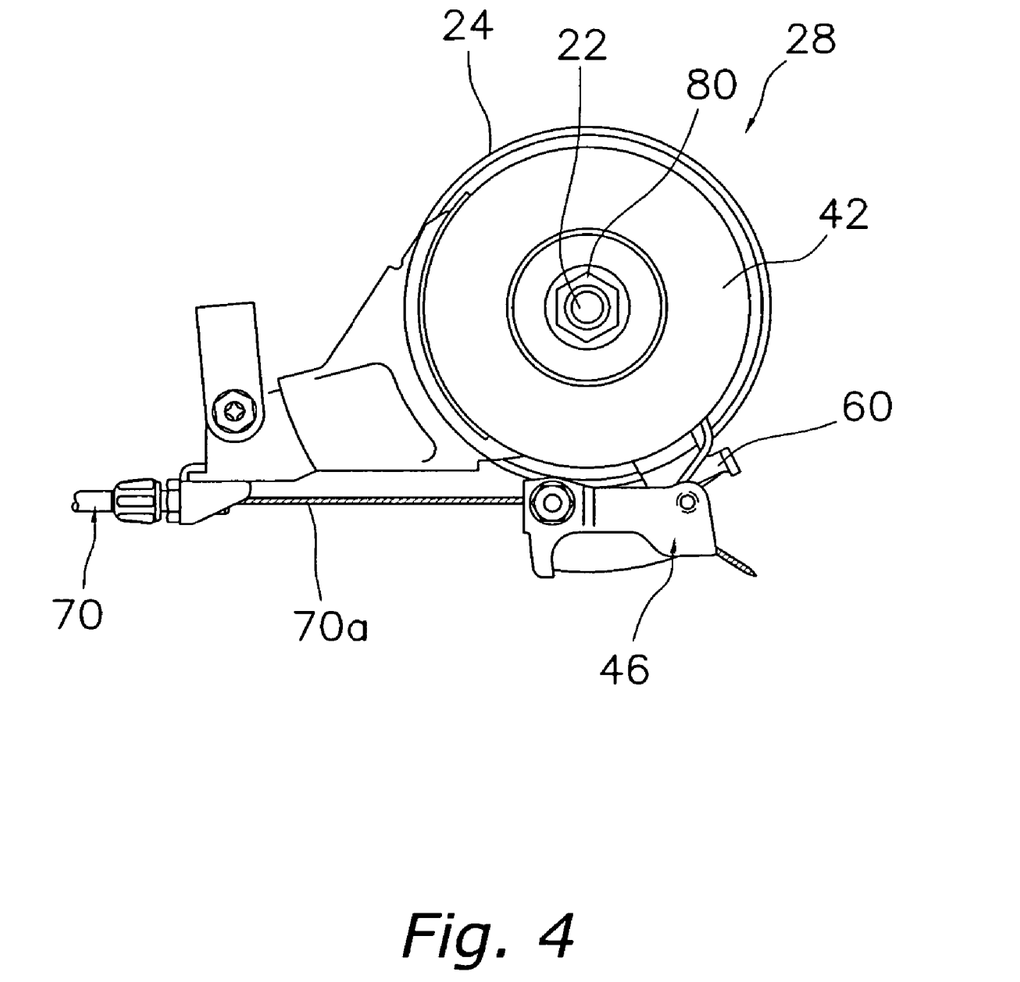
FIG. 4 is a side elevational view of the roller brake device mounted to the motor-equipped hub.
Figure 5:
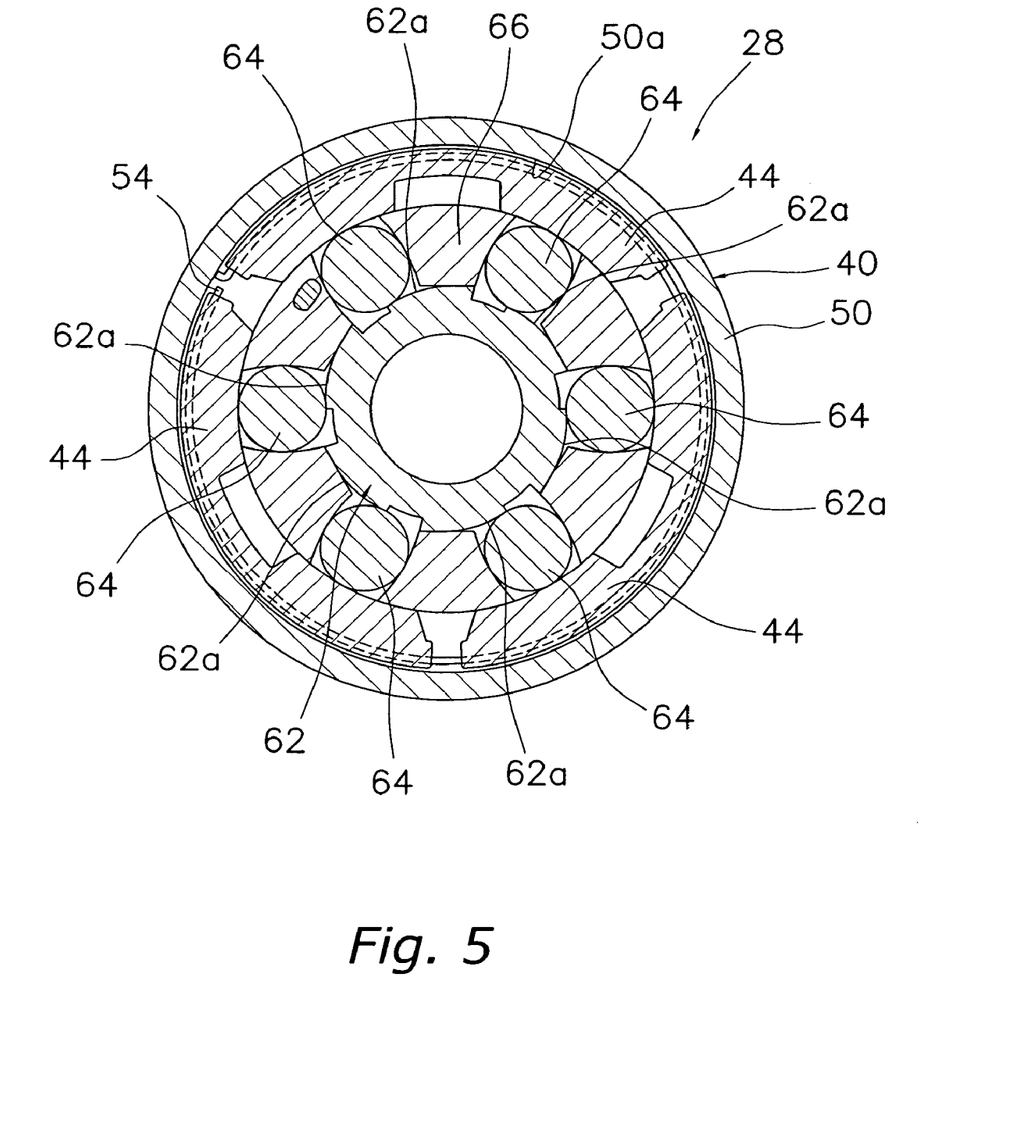
FIG. 5 is a transverse cross sectional view of the roller brake device showing the inside of a roller brake device.

As shown in FIGS. 3 to 5, the roller brake device 28 includes a brake drum 40, a stationary bracket 42 mounted non-rotatably to the frame 12, a brake shoe 44 configured and arranged to press against the brake drum 40 and apply braking action, a return spring 54 (exemplifying the "force applying member" mentioned in the claims) configured and arranged to apply a force against the brake shoe 44 in a radially inward direction, and a brake operating unit 46 configured to press the brake shoe 44 against the brake drum 40.

As shown in FIGS. 3 to 5, the roller brake device 28 includes a brake drum 40, a stationary bracket 42, plurality (three) of brake shoes 44, and a brake operating unit 46. The stationary bracket 42 is mounted non-rotatably to the frame 12. The brake shoes 44 are configured and arranged to press against the brake drum 40 and apply braking action. The brake operating unit 46 is configured to press the brake shoe 44 against the brake drum 40. A return spring 54 (also referred to as the "force applying member" herein) is provided that is configured and arranged to apply a force against the brake shoe 44 in a radially inward direction.

As shown in FIG. 3, the brake drum 40 is arranged such that it can rotate integrally with the hub shell 24. The brake drum 40 comprises a member shaped like a cylinder with a bottom. The brake drum 40 has a cylindrical drum section 50 and a circular disk-shaped support section 52 formed integrally with the drum section 50. A braking surface 50a is formed on the internal circumferential surface of the drum section 50. The braking surface 50a comprises a flat circular surface, with three annular grease filling grooves 50b formed in the axial direction of the braking surface 50a. an external circumferential surface of the drum section 50 is provided with a plurality of protrusions 50c defining a plurality of circumferentially spaced apart recesses. The protrusions 50c (also referred to as the "engaging part" herein) serve to mesh non-rotatably with the protrusions 24d of the brake installation section 24c of the hub shell 24. The protrusions 50c comprise serrations, splines, or other protrusions that have a width of, for example, 1 to 3 mm and that are spaced apart from one another in the circumferential direction. A bearing installation section 52a is provided inside the support section 52 and is configured to contact the outer race 38b of a bearing 38 whose inner race 38a is mounted onto the hub axle 22. As a result, the brake drum 40 is rotatably supported on the hub axle 22. Thus, in this embodiment, the left end of the hub shell 24 is rotatably supported on the hub axle 22 by the brake drum 40.

The stationary bracket 42 is mounted to the hub axle 22 and secured to the frame 12 in such a fashion as to prevent it from rotating. The stationary bracket 42 serves to prevent the brake shoe 44 from rotating and to pivotally support the brake operating unit 46. The stationary bracket 42 is mounted to the hub axle 22 with a fastening nut 80 screwed onto the hub axle 22.

The brake shoes 44 are arranged as a ring-shaped member that is divided into, for example, three sections. The brake shoes 44 are arranged so as to be prevented from rotating by the stationary bracket 42. The brake shoes 44 are spring loaded in a direction of separation from the braking surface 50a (radially inward direction) by a return spring 54. The return spring 54 is an annular spring member made of an elastic wire-like material that has been bent into a circular shape.

The brake operating unit 46 serves to press the brake shoe 44 against the braking surface 50a in opposition to the spring load force imposed by return spring 54 against the brake shoe 44. As shown in FIGS. 4 and 5, the brake operating unit 46 includes an operating arm 60 (FIG. 4), a cam member or mechanism 62, a plurality (e.g., six) of rollers 64, and a roller case 66. The operating arm 60 (FIG. 4) is mounted to the stationary bracket 42 in such a manner that it can rock freely.

The cam mechanism 62 is configured and arranged to pivot integrally with the operating arm 60. The rollers 64 are arranged between the cam member 62 and the brake shoe 44 so as to touch both the cam member 62 and the brake shoe 44 and be spaced apart from one another in the circumferential direction. The roller case 66 is configured to hold the rollers 64 at the circumferential spacing.

The operating arm 60 is a member made of a metal plate-like material. An inner cable 70a of a brake cable 70 is connected to one end of the operating arm 60. The other end of the inner cable 70a is connected to a brake lever 72 (FIG. 1) mounted to a handlebar 12b. The cam member 62 has six (for example) slanted surfaces 62a on the external circumference thereof that serve to push the rollers 64 radially outward when the cam member 62 turns.

When the brake lever 72 is operated and the inner cable 70a is pulled (moved leftward when viewed from the perspective of FIG. 4), the operating arm 60 swings clockwise (from the perspective of FIG. 4) about the hub axle 22 and the cam member 62 turns integrally with the movement of the operating arm 60. As a result, the rollers 64 are moved radially outward and the brake shoe 44 is pressed against the braking surface 50a of the brake drum 40. When the brake lever 72 is released, the inner cable 70a returns to its original position and the operating arm 60 swings counterclockwise (from the perspective of FIG. 4). As a result, the pressing of the rollers 64 is released and the return spring 54 moves the brake shoe 44 radially inward away from the braking surface 50a.

Since the roller brake device 28 is installed inside the hub shell 24, the brake shoes 44 are pressed by the rollers 64 in such a fashion that the entire contact surface of each of the brake shoes 44 contacts the braking surface 50a of the brake drum 40 when the roller brake device 28 is operated. Thus, even if the brake device is operated such that large braking forces are produced, the amount of generated heat is smaller and the coefficient of friction is less likely to decline. As a result, large braking forces can be obtained in a stable manner. Thus, even though the installation of the motor-equipped hub 20 causes the mass and speed of the bicycle 10 to increase, a sufficient braking force can be obtained in a stable manner.

OTHER EMBODIMENTS

Figure 6:
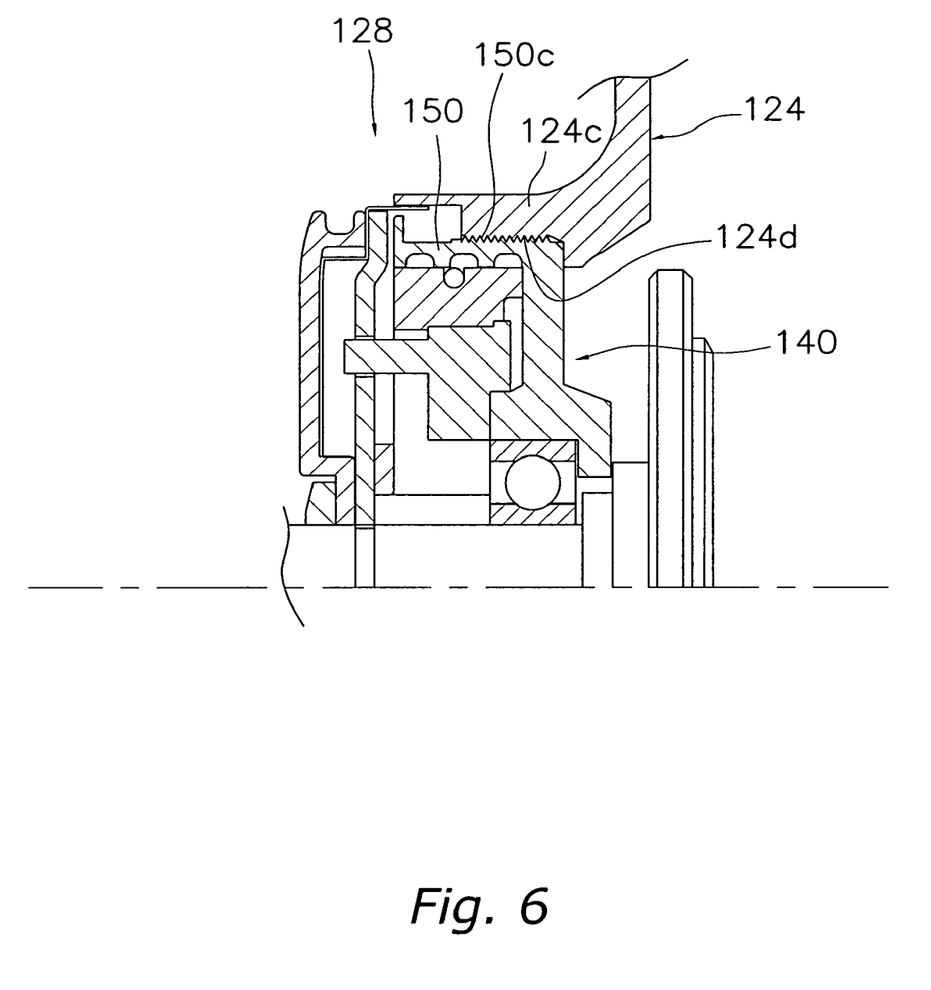
FIG. 6 is an enlarged partial cross sectional view, similar to FIG. 3, of the motor-equipped hub in the vicinity of the roller brake mounting adapter in accordance with another embodiment of the present invention.

Referring now to FIG. 6, a roller brake device 128 with a brake drum 140 is illustrated in accordance with a second embodiment. The roller brake device 128 is attached to a hub 124. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the roller brake device 28 is connected to the hub shell 24 using the engagement of the protrusions 24d and 50b such that the brake drum 40 can rotate integrally with the hub shell 24. However, as in this second embodiment, it is also acceptable to connect the brake drum 140 of the roller brake device 128 to a brake installation section 124c of the hub shell 124 using a screw-threaded connection so that the brake drum 140 can rotate integrally with the hub shell 124. In particular, as seen in FIG. 6, an internally threaded section 124d is formed on the internal circumferential surface of the brake installation section 124c of the hub shell 124. Meanwhile, an externally threaded section 150c (also referred to as the "engaging part" herein) is formed on the external circumferential surface of the drum section 150 of the brake drum 140. The externally threaded section 150c is configured to mesh with the internally threaded section 124d The screw-threaded sections 124d and 150c are oriented in such a direction that the engagement between the brake drum 140 and the hub shell 124 tightens when the rear wheel 16 is braked while rotating in a direction corresponding to forward movement of the bicycle. In the example shown in FIG. 6, the roller brake device 128 is arranged on the left side of the hub shell 124 when the bicycle is viewed from behind. Therefore, the screw-threaded sections 124d and 150c are configured as right-hand threads. All other features of the hub shell 124 and the roller brake device 128 are the same as the hub shell 24 and the roller brake device 18 in the first embodiment. Thus, the explanations of the hub shell 124 and the roller brake device 128 are omitted for the sake of brevity.

Although the previously described embodiments presents a roller brake device that is mounted to a motor-equipped hub installed on a rear wheel, the present invention can also be applied to a roller brake adapter that is mounted to a motor-equipped hub installed on a front wheel.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle wheel driving device comprising:
    a hub axle;
    a hub shell with a housing space inside, the hub shell rotatably arranged around the hub axle, and the hub shell having a hub flange on an outside circumference thereof and a cylindrical section arranged axially outwardly with respect to the housing space; and
    an electric motor disposed inside the housing space of the hub shell and configured to rotate the hub shell with respect to the hub axle; and
    a roller brake device at least partially arranged within the hub shell and extending outside of the hub shell, the roller brake device further including
        a stationary bracket configured to be fastened to a bicycle;
        a cylindrical brake drum arranged to rotate integrally with the hub shell and having a braking surface on an internal circumferential surface thereof, the brake drum including an engaging part that is provided on an external circumferential surface thereof and engages an internal circumferential surface of the cylindrical section of the hub shell, the engaging part including a screw thread oriented in such a direction such that engagement between the brake drum and the hub shell tightens the engaging part when the bicycle wheel is braked while rotating in a direction corresponding to forward movement of the bicycle;
        a plurality of brake shoes non-rotatably arranged with respect to the stationary bracket and arranged radially inwardly with respect to the cylindrical section of the hub shell at a location axially overlapping with the cylindrical section of the hub shell, each of the brake shoes having a contact surface arranged to selectively contact the braking surface to apply braking action against the brake drum;
        a force applying member arranged to apply forces against the brake shoes in radially inward directions; and
        a brake operating unit having a plurality of rollers arranged with spaces there between in a circumferential direction and a cam mechanism that presses the rollers in a radially outward direction when turned to press the brake shoes against the brake drum.

2. The bicycle wheel driving device as recited in claim 1, wherein
    the brake drum is rotatably supported on the hub axle by at least one bearing; and
    the hub shell includes a side end section rotatably supported on the hub axle by the brake drum of the roller brake device.

* * * * *